US012594680B2

(12) United States Patent
Hirata et al.

(10) Patent No.: US 12,594,680 B2
(45) Date of Patent: Apr. 7, 2026

(54) FLEXIBLE STRUCTURE AND METHOD FOR PRODUCING SAME

(71) Applicant: NHK SPRING CO., LTD., Kanagawa (JP)

(72) Inventors: Takafumi Hirata, Kanagawa (JP); Yuki Hotoda, Kanagawa (JP); Yuki Hayakawa, Kanagawa (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 18/291,904

(22) PCT Filed: Jul. 20, 2022

(86) PCT No.: PCT/JP2022/028173
§ 371 (c)(1),
(2) Date: Jan. 24, 2024

(87) PCT Pub. No.: WO2023/008275
PCT Pub. Date: Feb. 2, 2023

(65) Prior Publication Data
US 2024/0253251 A1     Aug. 1, 2024

(30) Foreign Application Priority Data
Jul. 27, 2021     (JP) ................................ 2021-122592

(51) Int. Cl.
*B25J 18/06* (2006.01)
*B25J 19/00* (2006.01)
(52) U.S. Cl.
CPC ............. *B25J 18/06* (2013.01); *B25J 19/007* (2013.01)
(58) Field of Classification Search
CPC . B25J 9/065; B25J 18/06; A61B 2017/00309; A61B 2017/00305; A61B 2017/00314
See application file for complete search history.

(56) References Cited

U.S. PATENT DOCUMENTS 6,068,250 A * 5/2000 Hawkins ................. F16F 1/328
267/164
8,347,754 B1 * 1/2013 Veltri ..................... A61B 34/30
606/1
(Continued)

FOREIGN PATENT DOCUMENTS

CN         111317571        6/2020
JP        2014090800        5/2014
(Continued)

OTHER PUBLICATIONS

"International Search Report (Form PCT/ISA/210) of PCT/JP2022/028173", mailed on Oct. 4, 2022, with English translation thereof, pp. 1-4.
(Continued)

*Primary Examiner* — Gregory Robert Weber
(74) *Attorney, Agent, or Firm* — JCIPRNET

(57) ABSTRACT

A flexible structure with a multi-joint function is formed by connecting flexing parts in which wave washers are stacked and welded to each other. The flexible structure includes a first flexing part, a second flexing part, and a connection part. The first flexing part and the second flexing part are capable of flexing and extending. The connection part is welded in an axial direction between the first flexing part and the second flexing part and has a rigidity higher than the first flexing part and the second flexing part. The first flexing part and the second flexing part each include wave washers stacked in the axial direction and welded to each other. The connection part has a circulating shape in which an inner circumference and an outer circumference are each continuous in a circumferential direction.

7 Claims, 9 Drawing Sheets

(56) References Cited

U.S. PATENT DOCUMENTS

| | | | | |
|---|---|---|---|---|
| 10,624,530 B2 * | 4/2020 | Graham | ............... | A01K 85/005 |
| 12,098,755 B2 * | 9/2024 | Otsuka | ................... | A61B 34/71 |
| 2004/0236316 A1 * | 11/2004 | Danitz | ................... | A61B 34/70 |
| | | | | 606/1 |

FOREIGN PATENT DOCUMENTS

| | | | | |
|---|---|---|---|---|
| JP | 2020172001 | 10/2020 | | |
| WO | 0213682 | 2/2002 | | |
| WO | 2020209386 | 10/2020 | | |
| WO | WO-2020209386 A1 * | 10/2020 | ............. | A61B 17/29 |

OTHER PUBLICATIONS

"Office Action of Taiwan Counterpart Application No. 111127126", issued on Apr. 13, 2023, with English translation thereof, p. 1-p. 13.

"International Preliminary report on patentability (Form PCT/IB/338) mailed on Feb. 8, 2024, International Preliminary report on patentability (Form PCT/IB/373) issued Jan. 18, 2024, Written Opinion (Form PCT/ISA/237) with English translation thereof mailed on Oct. 4, 2022, and International Preliminary report on patentability (Form PCT/IB/326) mailed on Feb. 8, 2024 of PCT/JP2022/028173", pp. 1-11.

"Search Report of Europe Counterpart Application", issued on Jun. 2, 2025, p. 1-p. 9.

* cited by examiner

FLEXIBLE STRUCTURE AND METHOD FOR PRODUCING SAME

CROSS-REFERENCE TO RELATED APPLICATION

This application is a 371 application of the International PCT application serial no. PCT/JP2022/028173, filed on Jul. 20, 2022, which claims the priority benefits of Japan Patent Application No. 2021-122592, filed on Jul. 27, 2021. The entirety of each of the above-mentioned patent applications is hereby incorporated by reference herein and made a part of this specification.

TECHNICAL FIELD

The present invention relates to a flexible structure provided at a joint function part of a robot or the like, and a method for producing the same.

RELATED ART

As disclosed in Patent Document 1, a conventional flexible structure is known to include a flexing part in which a plurality of wave washers are stacked and welded to each other. The flexible structure using this flexing part may be configured to be excellent in load bearing and flexibility while achieving diameter reduction.

On the other hand, in a flexible structure, a plurality of flexing parts may be connected to provide a multi-joint function. Such a flexible structure having a multi-joint function is expected to have a reduced diameter by applying flexing parts in which a plurality of wave washers are stacked and welded.

However, in such a flexible structure with a multi-joint function, it is difficult to shorten the distance between the flexing parts to connect the flexing parts integrally while enabling compatibility with diameter reduction.

RELATED ART DOCUMENTS

Patent Documents

Patent Document 1: Japanese Patent Application Laid-Open No. 2020-172001

SUMMARY OF INVENTION

Problem to be Solved by Invention

The problem to be solved lies in that, in a flexible structure with a multi-joint function obtained by connecting a plurality of flexing parts in which a plurality of wave washers are stacked and welded to each other, it is difficult to shorten the distance between the flexing parts to integrally connect the flexing parts while reducing the diameter of the flexible structure.

Means for Solving Problem

The present invention provides a flexible structure including a first flexing part, a second flexing part, and a connection part. The first flexing part and the second flexing part are capable of flexing and extending. The connection part is welded in an axial direction between the first flexing part and the second flexing part and has a rigidity higher than the first flexing part and the second flexing part. The first flexing part and the second flexing part each include a plurality of wave washers that are stacked in the axial direction and are welded to each other. The connection part has a circulating shape in which an inner circumference and an outer circumference are each continuous in a circumferential direction.

In addition, the present invention provides a method for producing the flexible structure, including steps below. The plurality of wave washers of the first flexing part are sequentially stacked and welded from one side in the axial direction of the connection part. The plurality of wave washers of the second flexing part are sequentially stacked and welded from another side in the axial direction of the connection part.

Effect of Invention

According to the present invention, in the flexible structure with a multi-joint function obtained by connecting a plurality of flexing parts in which a plurality of wave washers are stacked and welded to each other, it is possible to shorten the distance between the flexing parts to integrally connect the flexing parts while achieving diameter reduction as a whole.

DESCRIPTION OF EMBODIMENTS

Figure 1:
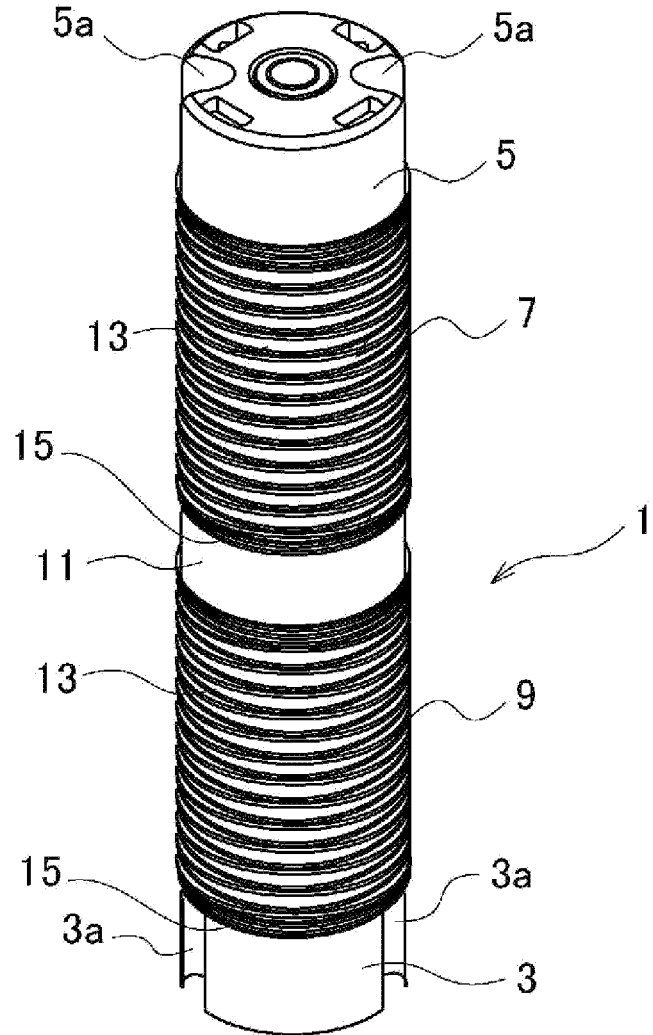
FIG. 1 is a perspective view showing a flexible structure according to Embodiment 1 of the present invention.

In a flexible structure with a multi-joint function obtained by connecting a plurality of flexing parts in which a plurality of wave washers are stacked and welded to each other, an objective of shortening the distance between the flexing parts to integrally connect the flexing parts while reducing the diameter of the flexible structure is realized from both the structural aspect and the production aspect.

A flexible structure (1) includes a first flexing part (7), a second flexing part (9), and a connection part (11). The first flexing part (7) and the second flexing part (9) are capable of flexing and extending and each include a plurality of wave washers (13) that are stacked in an axial direction and are welded to each other. The connection part (11) is welded in the axial direction between the first flexing part (7) and the second flexing part (9), has a rigidity higher than the first flexing part (7) and the second flexing part (9), and has a circulating shape in which an inner circumference and an outer circumference are each continuous in a circumferential direction.

A width of the connection part (11) between the inner circumference and the outer circumference may be constant.

Welding between the plurality of wave washers (13) may be performed at a middle part between an inner circumference and an outer circumference of each of the wave washers (13). The connection part (11) may be configured to overlap, in the axial direction, with welded portions (W) of the plurality of wave washers (13).

One or both of the first flexing part (7) and the second flexing part (9) may include a flat washer (15) that constitutes an end part in the axial direction. The flat washer (15) may be welded in a state abutting against the connection part (11) over an entire circumference. The plurality of wave washers (13) may be configured to be welded to the connection part (11) via the flat washer (15).

A method for producing such a flexible structure (1) includes: sequentially stacking and welding the plurality of wave washers (13) of the first flexing part (7) from one side in the axial direction of the connection part (11); and sequentially stacking and welding the plurality of wave washers (13) of the second flexing part (9) from another side in the axial direction of the connection part (11).

In a case where the plurality of wave washers (13) and the connection part (11) have an insertion hole (7a, 9a, 11b) for inserting a cord-shaped member (17a, 17b), a guide member (G) may be inserted into the insertion hole (11b) of the connection part (11), and when stacking the plurality of wave washers (13) of the first flexing part (7) and the second flexing part (9), the guide member (G) may be inserted into the insertion hole (7a, 9a) of the plurality of wave washers (13) to position to the connection part (11).

A flat washer (15) may be stacked and welded on one or both of one side and another side in the axial direction of the connection part (11), and the plurality of wave washers (13) may be sequentially stacked and weld in the axial direction to the flat washer (15).

Embodiment 1

[Configuration of Flexible Structure]

Figure 2:
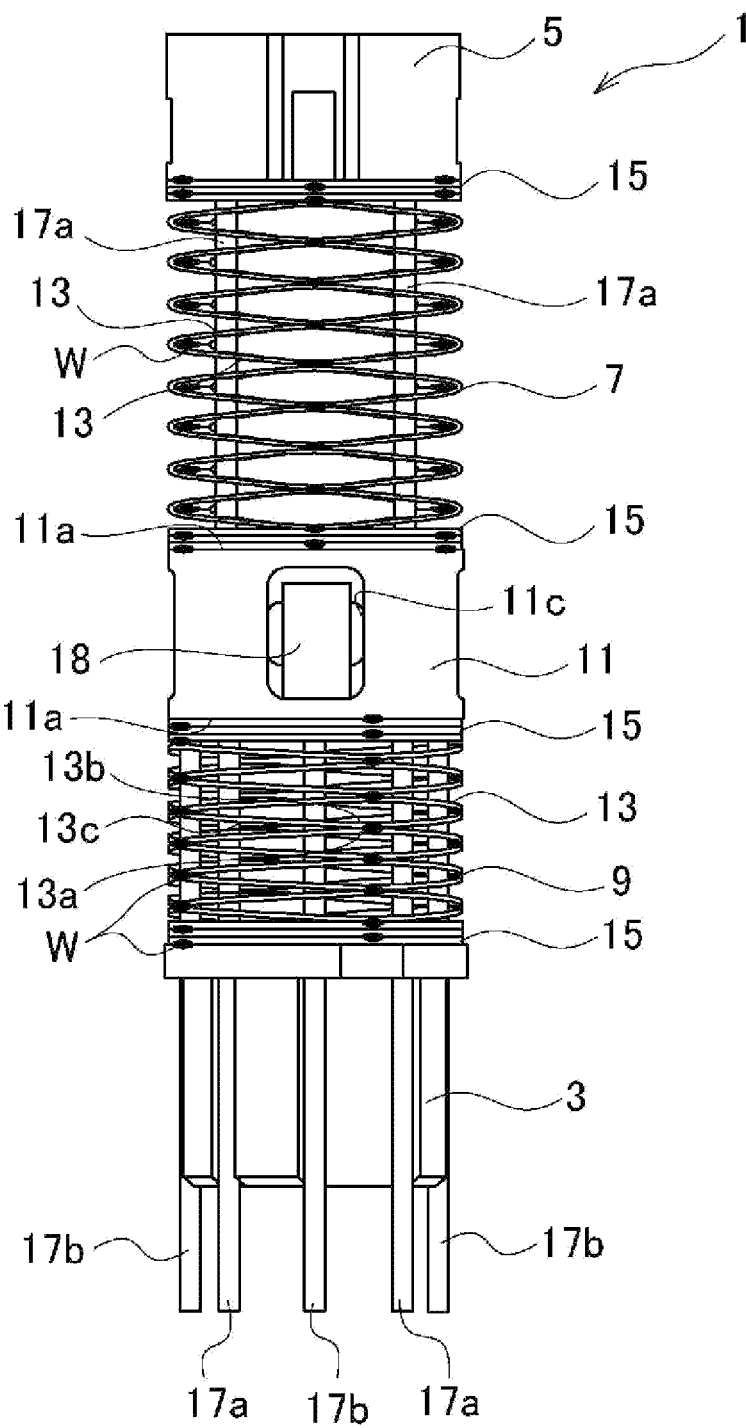
FIG. 2 is a side view of the flexible structure shown in FIG. 1.
Figures 3, 4:
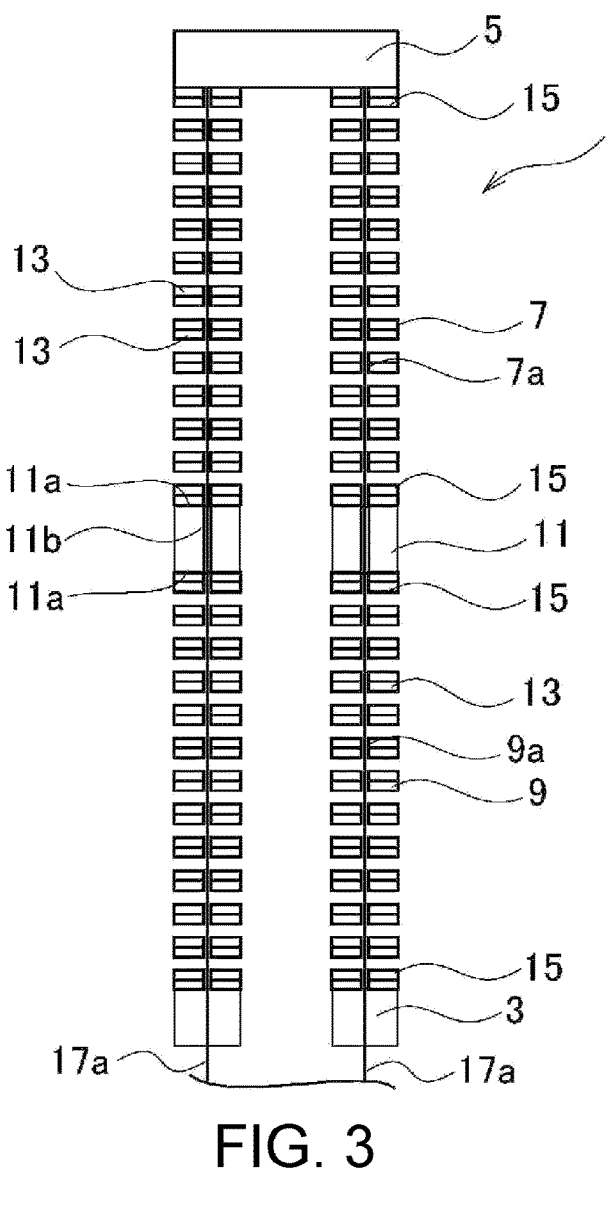
FIG. 3 is a schematic cross-sectional view of the flexible structure shown in FIG. 2.
FIG. 4 is a plan view of a wave washer used in the flexible structure shown in FIG. 1.

FIG. 1 is a perspective view showing a flexible structure according to Embodiment 1 of the present invention. FIG. 2 is a side view of the flexible structure. FIG. 3 is a schematic cross-sectional view of the flexible structure. FIG. 1 to FIG. 3 show the same structure, although the shapes of each part are slightly different.

The flexible structure 1 is applicable to joint function parts of various machines for medical or industrial use, such as manipulators, robots, and actuators. The joint function part is an apparatus, a mechanism, a device, etc. having a function as a joint that flexes and extends.

The flexible structure 1 of this embodiment includes a base part 3, a movable part 5, a first flexing part 7 and a second flexing part 9, and a connection part 11.

The base part 3 is composed of a columnar body, e.g., a cylindrical body, formed of metal, resin, etc., and is attached to an end part of a shaft of a manipulator or the like. The base part 3 is not limited to a columnar body, but may be in any appropriate forms depending on the machine to which the flexible structure 1 is applied.

A recess 3a in the radial direction is provided at the base part 3. The recess 3a is provided along the axial direction with respect to the base part 3. The base part 3 has an outer circumference that is discontinuous in the circumferential direction due to this recess 3a. The recess 3a enables welding on the base part 3 side with respect to the second flexing part 9 as described later.

The "radial direction" refers to a direction along the diameter of the flexible structure 1, and includes a direction slightly inclined with respect to the diameter. The "axial direction" refers to a direction along the axis of the flexible structure 1, and includes a direction slightly inclined with respect to the axis. The "circumferential direction" refers to a direction along the outer circumference of the flexible structure 1.

The movable part 5 is supported at the base part 3 by the first flexing part 7 and the second flexing part 9 in a manner capable of displacing with respect to the axial direction. An end effector or the like corresponding to the machine to which the flexible structure 1 is applied is attached to this movable part 5.

This movable part 5 is formed of metal, resin, etc. into a columnar body as a whole. Similar to the base part 3, the movable part 5 may be in any appropriate forms depending on the machine to which the flexible structure 1 is applied, and is not limited to a columnar body made of metal, resin, etc.

Similar to the base part 3, a recess 5a in the radial direction is provided at the movable part 5 along the axial direction. Thus, the movable part 5 has an outer circumference that is discontinuous in the circumferential direction due to the recess 5a. The recess 5a enables welding on the movable part 5 side with respect to the first flexing part 7 as described later.

The first flexing part 7 and the second flexing part 9 are capable of flexing and extending, and each includes a plurality of wave washers 13 and a plurality of flat washers 15.

The first flexing part 7 and the second flexing part 9 have basically the same configuration, with different lengths in the axial direction. In this embodiment, the first flexing part 7 is longer in the axial direction than the second flexing part 9. However, the first flexing part 7 may also be configured to be shorter in the axial direction than the second flexing part 9. The first flexing part 7 and the second flexing part 9 may also have the same length. Furthermore, it is also possible that the first flexing part 7 and the second flexing part 9 do not have the same configuration, as in a configuration in which one of them has a smaller diameter than the other, or a configuration in which plane shapes of the wave washers 13 are different from each other.

Also, although the flexible structure 1 may also have three or more flexing parts, in that case as well, the tip side with respect to the connection part 11 is the first flexing part 7, and the base side is the second flexing part 9. The tip and the base refer to the tip and the base in the axial direction of the flexible structure 1.

FIG. 4 is a plan view showing the wave washer 13.

As shown in FIG. 1 to FIG. 4, the plurality of wave washers 13 are stacked in the axial direction and are welded to each other to maintain the stacked state. Due to elastic deformation of these wave washers 13, the first flexing part 7 and the second flexing part 9 are capable of flexing elastically.

Each wave washer 13 is a plate material formed of metal or the like into an annular shape. The wave washer 13 of this embodiment is a ring-shaped plate material composed of stainless steel, and a radial width between the inner circumference and the outer circumference and a plate thickness are constant.

An abutting portion of this wave washer 13 is welded to the adjacent wave washer 13. This welding is performed at a middle part between the inner circumference and the outer circumference of each wave washer 13.

The "middle part" between the inner circumference and the outer circumference of each wave washer 13 refers to a region between the inner circumference and the outer circumference excluding portions on the inner circumference and the outer circumference, and does not refer to the central position of the width between the inner circumference and the outer circumference. Thus, the welding on the middle part between the inner circumference and the outer circumference may be performed not only at the central position of the width between the inner circumference and the outer circumference, but also at positions biased toward the inner circumferential side or the outer circumferential side from the central position. In addition, this welding may also be performed at a plurality of spots arranged in the radial direction of the middle part between the inner circumference and the outer circumference. The welding may also be performed on the inner circumference and the outer circumference of each wave washer 13.

Specifically, the wave washer 13 has a plurality of peak parts 13a in the circumferential direction and has a valley part 13b between adjacent peak parts 13a. Between wave washers 13 adjacent in the axial direction, the peak part 13a of one wave washer 13 abuts against the valley part 13b of the other wave washer. At the peak part 13a and the valley part 13b abutting against each other, the middle parts between the inner circumference and the outer circumference are bonded together by a welding part W by laser welding or the like.

It is also possible that the peak part 13a and the valley part 13b do not abut against each other and may be, for example, in a form shifting in the circumferential direction from each other and abutting against an inclined part 13c. The shape, material, etc. of the wave washer 13 may be appropriately changed depending on the required characteristics or the like.

Figures 5, 6:
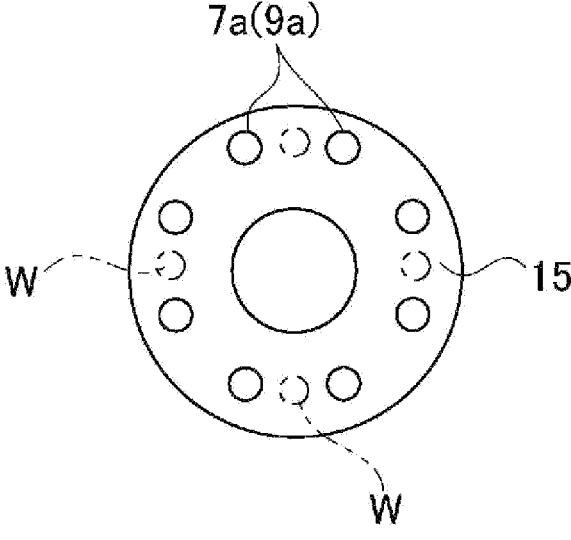
FIG. 5 is a plan view of a flat washer used in the flexible structure shown in FIG. 1.
FIG. 6 is a plan view showing a connection part used in the flexible structure shown in FIG. 1.

FIG. 5 is a plan view showing the flat washer 15.

As shown in FIG. 1 to FIG. 3 and FIG. 5, the plurality of flat washers 15 constitute both end parts in the axial direction of the first flexing part 7 and the second flexing part 9, and are welded to each other, to adjacent wave washers 13, and to the connection part 11 and the base part 3 or the movable part 5. That is, the plurality of wave washers 13 are configured to be welded to the connection part 11 via the plurality of flat washers 15.

The flat washers 15 may be provided only at both end parts of one of the first flexing part 7 and the second flexing part 9. Also, the flat washers 15 may be provided only at one end part on one or both of the first flexing part 7 and the second flexing part 9. Furthermore, the flat washers 15 may also be omitted.

In this embodiment, the number of the flat washers 15 is three, but may also be changed in any manner to one, two, or four or more, for example.

The welding part W between the flat washer 15 and the wave washer 13 is formed at the middle part of the inner circumference and the outer circumference at the abutting portion between the flat washer 15 and the wave washer 13.

The welding part W between the flat washers 15, the welding part W between the flat washer 15 and the base part 3 and the movable part 5, and the welding part W between the flat washer 15 and the connection part 11 are formed at the middle part of the inner circumference and the outer circumference at positions sequentially displaced in the circumferential direction, in a manner imitating the bonding of the wave washers 13 to each other.

Each flat washer 15 is a plate material formed of metal or the like into an annular shape, has the same inner and outer diameters and plate thickness made of the same material as the wave washer 13, and is formed to be flat.

When the first flexing part 7 and the second flexing part 9 flex, this flat washer 15 deforms together with the wave washer 13 such that they open between each other, but the deformation amount of the flat washer 15 is smaller than the wave washer 13. The flat washer 15 may also be formed using a material different from the wave washer 13.

FIG. 6 is a plan view showing the connection part 11.

As shown in FIG. 1 to FIG. 3 and FIG. 6, the connection part 11 is a member that is welded in the axial direction between the first flexing part 7 and the second flexing part 9, and has a rigidity higher than the first flexing part 7 and the second flexing part 9. The "rigidity" refers to a bending rigidity with respect to the axial direction. This connection part 11 constitutes a multi-joint by connecting the first flexing part 7 and the second flexing part 9.

The connection part 11 has a circulating shape in which the inner circumference and the outer circumference are each continuous in the circumferential direction. Herein, "continuous" means that the inner circumference or the outer circumference is not discontinuous due to recesses or notches along the axial direction for welding to the end parts of the first flexing part 7 and the second flexing part 9, also including cases of discontinuity due to presence of slight recesses or the like at the inner circumference or the outer circumference.

The connection part 11 of this embodiment has a cylindrical shape, and the width between the inner circumference and the outer circumference is constant. To configure the width between the inner circumference and the outer circumference to be constant, the connection part 11 may have a plane shape without corners. Thus, the connection part 11 may also have an elliptical tubular shape. In addition, the connection part 11 may also have a rectangular tubular shape with a non-constant width between the inner circumference and the outer circumference. Furthermore, at the connection part 11, the diameter of one or both of the inner circumference and the outer circumference may also change in the axial direction. In that case, connection may be provided between the flexing parts having diameters different from each other.

The connection part 11 of this embodiment overlaps in the axial direction with the welding parts W which are welded portions of the plurality of wave washers 13 and the plurality of flat washers 15. Accordingly, the connection part 11 may reliably receive the first flexing part 7 and the second flexing part 9 to stabilize the action.

A joining surface 11a that has a flat circulating shape with a constant width is formed on both sides in the axial direction of the connection part 11. With this joining surface 11a, the flat washer 15 to be bonded to the connection part 11 abuts against the connection part 11 evenly over the entire circumference. In this state, the flat washer 15 is welded to the connection part 11. Thus, the connection part 11 can more reliably receive the first flexing part 7 and the second flexing part 9 to stabilize the action.

Such a connection part 11 is provided with an insertion hole 11b and a holding part 11c for wires 17a and 17b, which are cord-shaped members. The cord-shaped members include those for operation of the flexible structure 1 such as the wires 17a and 17b, as well as those for electrical conduction, guiding, etc. The cord-shaped members for guiding serve to guide cord-shaped members for operation or electrical conduction.

In addition to the wires 17a and 17b, the cord-shaped members may be appropriate members such as single wires, stranded wires, piano wires, multi-joint rods, chains, strings, threads, ropes, etc. The material of the cord-shaped members may be an appropriate material such as metal including stainless steel, nickel titanium (NiTi), carbon steel, etc.

A plurality of insertion holes 11b are provided in the circumferential direction with respect to the connection part 11. The insertion holes 11b penetrate the connection part 11 in the axial direction. These insertion holes 11b communicate, in the axial direction, with insertion holes 7a and 9a of the first flexing part 7 and the second flexing part 9.

The insertion holes 7a and 9a are provided penetrating the wave washer 13 and the flat washer 15. In this embodiment, the insertion holes 7a and 9a are communicated in the axial direction, but it is also possible to form them at positions displaced in the circumferential direction between adjacent wave washers 13 and flat washers 15.

With the insertion holes 7a, 9a, and 11b, in the flexible structure 1, the wire 17a for operating the first flexing part 7 is inserted and guided in the axial direction, from the second flexing part 9 side, through the connection part 11, to the first flexing part 7.

The wire 17a inserted into the first flexing part 7 has a tip held by the movable part 5 and is capable of flexing the first flexing part 7 and displacing the movable part 5 by pulling on the base side.

The holding part 11c of the connection part 11 holds the tip of the wire 17b for operating the second flexing part 9. This holding part 11c is composed of a space part that is opened on the outer circumference at a middle part in the axial direction of the connection part 11.

Thus, the connection part 11 loses its continuity of the outer circumference due to the holding part 11c, but maintains its continuity on both sides in the axial direction.

The insertion hole 11b of the connection part 11 communicates with the holding part 11c. The insertion hole 11b communicates in the axial direction with the insertion hole 9a of the second flexing part 9. Accordingly, the wire 17b for operating the second flexing part 9 is inserted and guided in the axial direction through the second flexing part 9 to the connection part 11.

Then, the wire 17b has a tip held by the holding part 11c of the connection part 11 and is capable of flexing the second flexing part 9 and displacing the connection part 11 by pulling on the base side.

In this embodiment, the holding of the tip of the wire 17b is performed by engaging, with the holding part 11c, an end treatment member 18 such as a sleeve attached to the tip of the wire 17b.

The holding of the tip of the wire 17b is not limited to engagement of the end treatment member 18 with the holding part 11c, but may be performed by any appropriate method, and the holding part 11c may be omitted in some cases.

[Method for Producing Flexible Structure]

FIG. 7 to FIG. 11 are side views showing a method for producing the flexible structure 1.

As shown in FIG. 7 to FIG. 11, the method for producing the flexible structure 1 of this embodiment includes attaching the first flexing part 7 and the second flexing part 9 to the connection part 11.

Figure 7:
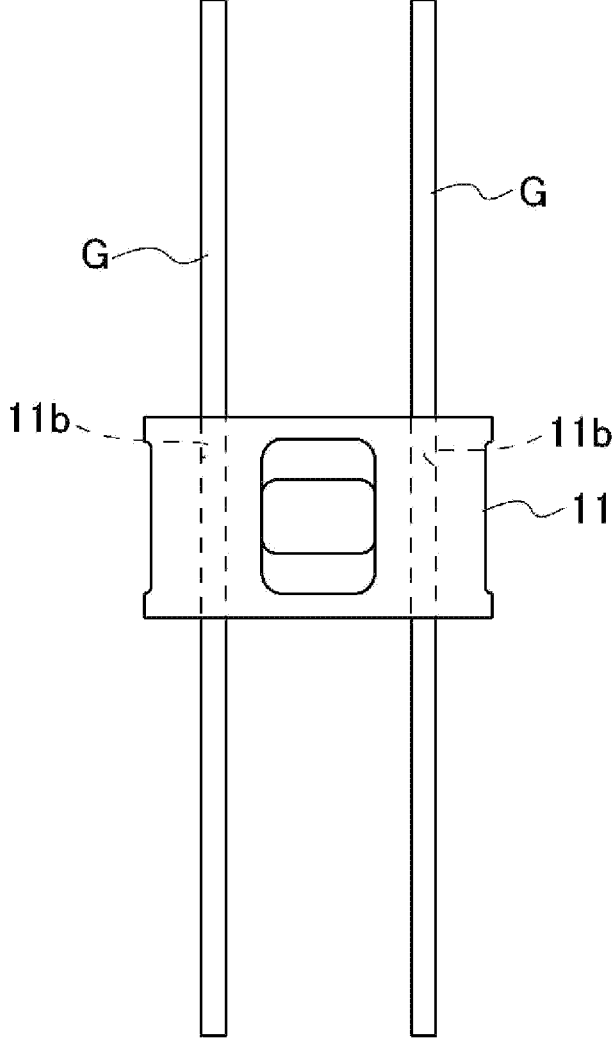
FIG. 7 is a side view showing a method for producing the flexible structure according to Embodiment 1 of the present invention.

First, as shown in FIG. 7, one side in the axial direction of the connection part 11 is arranged to face upward. This arrangement may be performed using an appropriate holding tool.

In this state, a guide member G is inserted into the insertion hole 11b of the connection part 11. The guide member G is a rod-shaped body or a cord-shaped member. The guide member G preferably has a rigidity to a degree allowing standing on its own.

Figure 8:
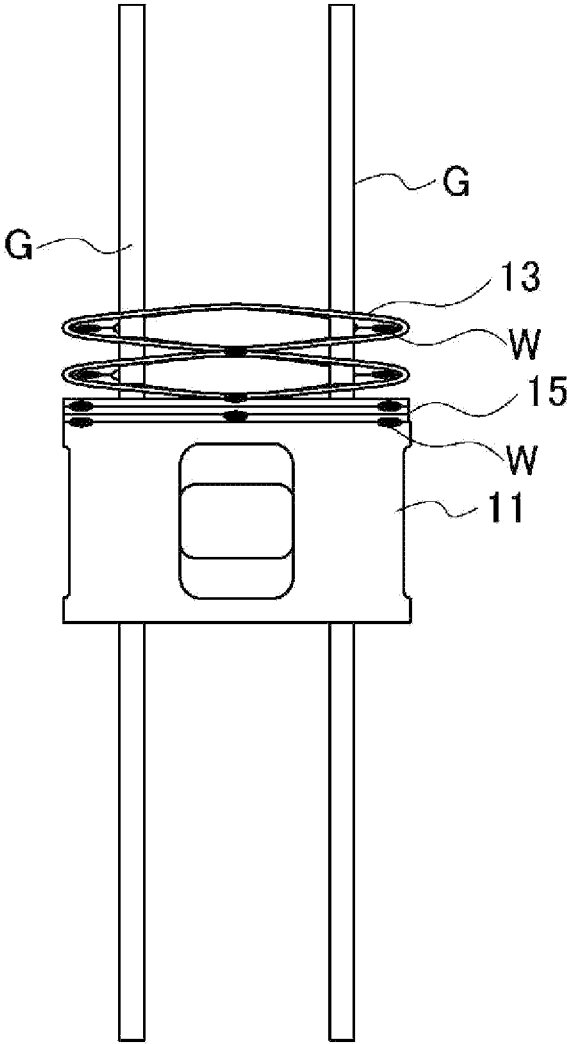
FIG. 8 is a side view showing the method for producing the flexible structure according to Embodiment 1 of the present invention.
Figure 9:
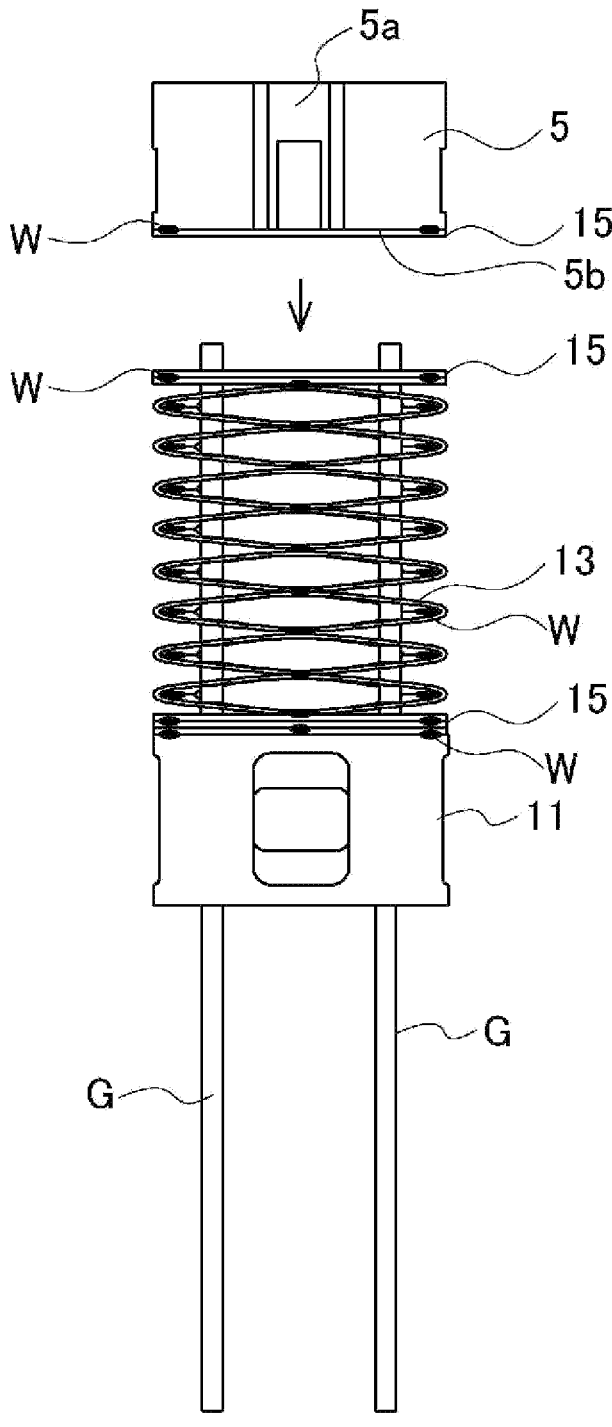
FIG. 9 is a side view showing the method for producing the flexible structure according to Embodiment 1 of the present invention.

Then, as shown in FIG. 8 and FIG. 9, the first flexing part 7 is attached to the connection part 11. Specifically, the plurality of flat washers 15 of the first flexing part 7 are stacked and welded on one side in the axial direction of the connection part 11. The welding may be performed using an appropriate method such as carbon dioxide laser, yttrium aluminum garnet (YAG) laser, fiber laser, etc.

The plurality of wave washers 13 are sequentially stacked and welded on the stacked flat washers 15. Accordingly, the plurality of wave washers 13 are sequentially stacked and welded from one side in the axial direction of the connection part 11.

When stacking the plurality of flat washers 15 and the plurality of wave washers 13, positioning can be performed with respect to the connection part 11 by inserting the guide member G into the insertion holes 7a provided at the flat washers 15 and wave washers 13 of the first flexing part 7. The guide member is not limited to one that is inserted into the insertion hole 7a. For example, the guide member may also be located on the outer side of the flat washers 15 and the wave washers 13, such as one that guides the outer circumferences of the flat washers 15 and the wave washers 13, or the guide member may also be located on the inner side of the flat washers 15 and the wave washers 13, such as one that guides the inner circumferences of the flat washers 15 and the wave washers 13.

After stacking the plurality of flat washers 15 and the plurality of wave washers 13 of the first flexing part 7, the movable part 5 is stacked.

At this time, the flat washer 15 of the first flexing part 7 is attached by welding to a bonding surface 5b of the movable part 5 to be bonded to the first flexing part 7. On the other hand, two flat washers 15 (i.e., one flat washer fewer) are stacked at the end part of the first flexing part 7 to which the movable part 5 is to be attached.

On these flat washers 15, the flat washer 15 bonded to the movable part 5 is stacked and welded via the recess 5a of the movable part 5.

Figure 10:
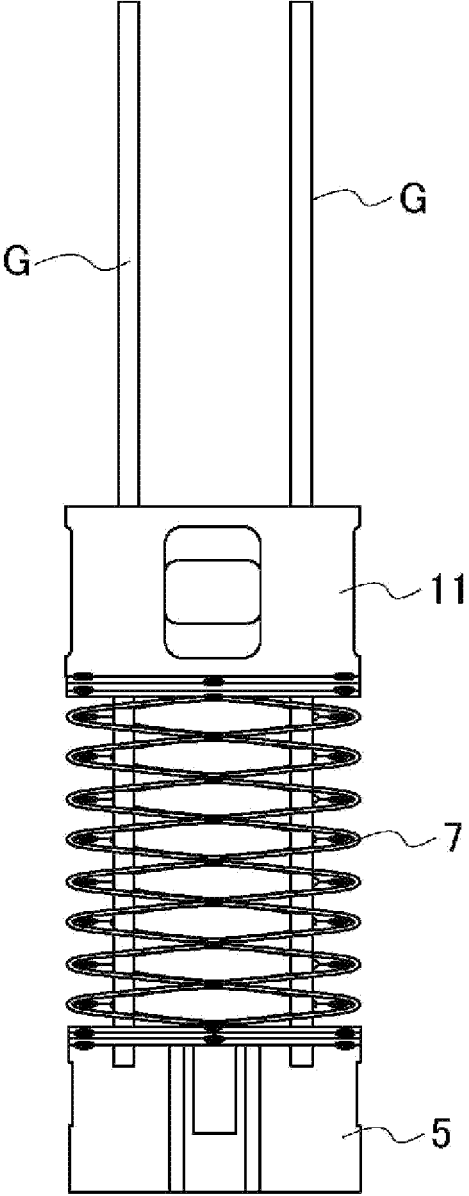
FIG. 10 is a side view showing the method for producing the flexible structure according to Embodiment 1 of the present invention.

After connecting the first flexing part 7 to the connection part 11 in this manner, as shown in FIG. 10, the other side in the axial direction of the connection part 11 is arranged to face upward.

Figure 11:
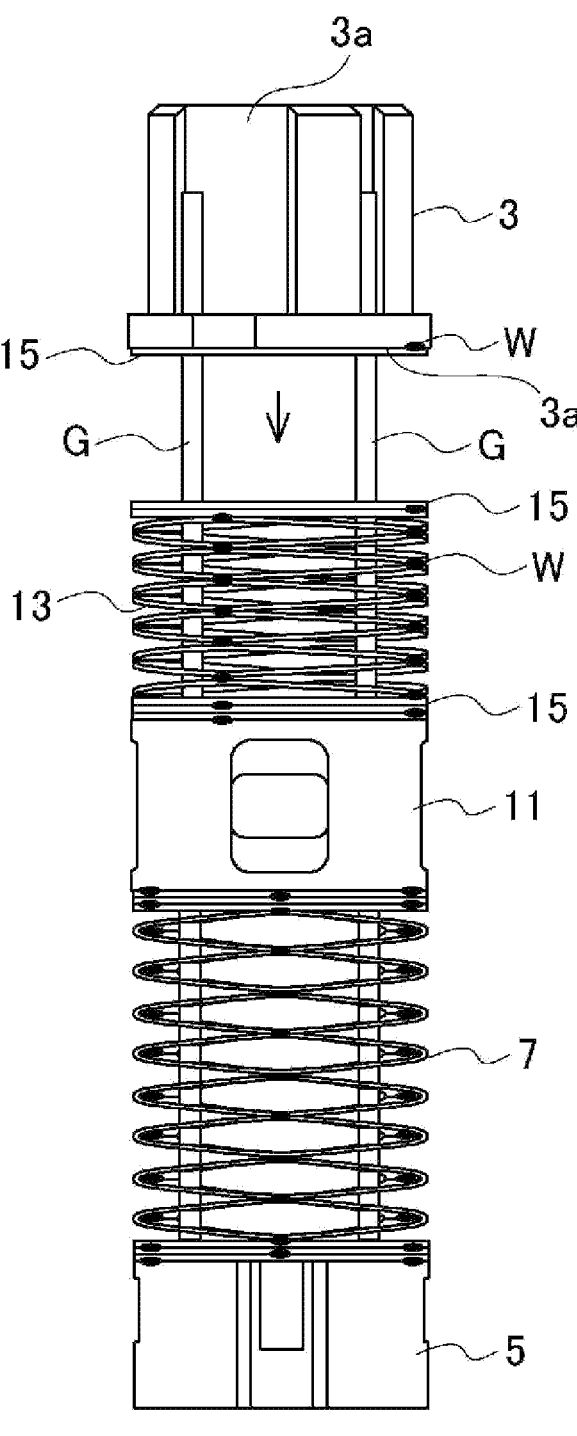
FIG. 11 is a side view showing the method for producing the flexible structure according to Embodiment 1 of the present invention.

In this state, as shown in FIG. 11, the second flexing part 9 is attached to the connection part 11. Specifically, the plurality of flat washers 15 and the plurality of wave washers 13 of the second flexing part 9 are sequentially stacked and welded from the other side in the axial direction of the connection part 11.

When stacking the plurality of flat washers 15 and the plurality of wave washers 13, similar to the first flexing part 7, positioning can be performed with respect to the connection part 11 by inserting the guide member G into the insertion holes 9a provided at the flat washers 15 and the wave washers 13 of the second flexing part 9.

After stacking the plurality of flat washers 15 and the plurality of wave washers 13 of the second flexing part 9, the base part 3 is stacked.

The stacking of the base part 3 may be performed in the same manner as the stacking of the movable part 5 with respect to the first flexing part 7. That is, the base part 3, to which the flat washer 15 of the second flexing part 9 is attached by welding at the bonding surface, is stacked at the end part of the second flexing part 9 on which two flat washers 15 (i.e., one flat washer fewer) are stacked.

Then, the flat washers 15 on the second flexing part 9 side and the flat washer 15 on the base part 3 side are welded via the recess 3a of the base part 3 in the stacked state.

In this manner, the movable part 5 and the base part 3 can be attached to the connection part 11 via the first flexing part 7 and the second flexing part 9. Afterwards, upon pulling the guide member G out from the base part 3 side, the flexible structure 1 is completed.

In this embodiment, although the first flexing part 7 and the second flexing part 9 are sequentially attached to the connection part 11, the sequence of attaching the first flexing part 7 and the second flexing part 9 may be configured in any manner. For example, the second flexing part 9 may be attached to the connection part 11 before the first flexing part 7. Also, the wave washers 13 of the first flexing part 7 and the second flexing part 9 may be stacked alternately while inverting the connection part 11 in the axial direction.

With such a production method, in the flexible structure 1 of this embodiment, it is not required to provide a recess for welding at the connection part 11, and it is possible to configure the inner circumference and the outer circumference of the connection part 11 as a circulating shape continuous in the circumferential direction.

In this flexible structure 1, it is possible to reduce the diameter of the connection part 11, and it becomes possible to reduce the distance between the flexing parts 7 and 9 to integrally connect the flexing parts 7 and 9 while reducing the diameter of the flexible structure 1.

That is, in the case where a recess for welding similar to those on the base part 3 and the movable part 5 is provided at the connection part 11, if the connection part 11 is reduced in diameter, the proportion occupied by the recess at the connection part 11 becomes large. This structure is not capable of withstanding the load of the wire 17b, and there are limitations on diameter reduction and shortening in the axial direction.

In contrast, in the flexible structure 1 of this embodiment, even if the connection part 11 is reduced in diameter or shortened in the axial direction, it is still possible to withstand the load of the wire 17b with the circulating shape in which the inner circumference and the outer circumference are continuous in the circumferential direction. As a result, the flexible structure 1 is compatible with diameter reduction as a whole.

The invention claimed is:

1. A flexible structure comprising:
a first flexing part and a second flexing part that are capable of flexing and extending; and a connection part that is welded in an axial direction between the first flexing part and the second flexing part and has a rigidity higher than the first flexing part and the second flexing part, wherein the first flexing part and the second flexing part each comprise a plurality of wave washers that are stacked in the axial direction and are welded to each other, and the connection part has a circulating shape in which an inner circumference and an outer circumference are each continuous in a circumferential direction, and the connection part does not have a recess, and does not have a notch, along the axial direction for welding to ends of the first flexing part and the second flexing part.

2. The flexible structure according to claim 1, wherein a width of the connection part between the inner circumference and the outer circumference is constant.

3. The flexible structure according to claim 1, wherein welding between the plurality of wave washers is performed at a middle part between an inner circumference and an outer circumference of each of the wave washers, and the connection part overlaps, in the axial direction, with welded portions of the plurality of wave washers.

4. The flexible structure according to claim 1, wherein one or both of the first flexing part and the second flexing part comprise a flat washer that constitutes an end part in the axial direction, the flat washer is welded in a state abutting against the connection part over an entire circumference, and the plurality of wave washers are welded to the connection part via the flat washer.

5. A method for producing a flexible structure, which is a method for producing the flexible structure according to claim 1, the method comprising:

sequentially stacking and welding the plurality of wave washers of the first flexing part from one side in the axial direction of the connection part; and sequentially stacking and welding the plurality of wave washers of the second flexing part from another side in the axial direction of the connection part.

6. The method for producing a flexible structure according to claim 5, wherein the plurality of wave washers and the connection part have an insertion hole for inserting a cord-shaped member, the method comprising:

inserting a guide member into the insertion hole of the connection part; and when stacking the plurality of wave washers of the first flexing part and the second flexing part, inserting the guide member into the insertion hole of the plurality of wave washers to position to the connection part.

7. The method for producing a flexible structure according to claim 5, comprising:

stacking and welding a flat washer on one or both of one side and another side in the axial direction of the connection part; and sequentially stacking and welding the plurality of wave washers in the axial direction to the flat washer.

* * * * *